United States Patent [19]
Matthews, Jr.

[11] 3,903,728
[45] Sept. 9, 1975

[54] ONE-WAY PIG MEANS

[75] Inventor: Jamie F. Matthews, Jr., Houston, Tex.

[73] Assignee: Exxon Production Research Company, Houston, Tex.

[22] Filed: Nov. 5, 1973

[21] Appl. No.: 413,007

[52] U.S. Cl............................... 73/40.5 R; 138/90
[51] Int. Cl.² ........................................... G01M 3/08
[58] Field of Search.............. 73/40.5 R, 49.1, 49.5, 73/49.8; 138/90, 97

[56] References Cited
UNITED STATES PATENTS
| | | | |
|---|---|---|---|
| 3,431,946 | 3/1969 | Sawyer | 73/40.5 R X |
| 3,561,490 | 2/1971 | Little | 73/49.1 |
| 3,722,261 | 3/1973 | Milke | 73/40.5 R |

Primary Examiner—Charles A. Ruehl
Attorney, Agent, or Firm—James E. Gilchrist

[57] ABSTRACT

A one-way pig means adapted for travel through a pipeline in one direction and useful, for example, in the recovery of marine pipelines or the detection of pipeline leaks is provided in which the pipeline pig advances through a pipeline under the action of a differential fluid pressure in one direction but upon action of a differential fluid pressure from the opposite direction the pig engages the walls of the pipeline thereby resisting movement. The one-way pig engages the inside wall of the pipeline by the wedging action of a disc-shaped, rigid plate against a resilient pigging cup providing a tight, leakproof seal through such wedging action. The wedging action increases as the differential fluid pressure increases.

6 Claims, 3 Drawing Figures

ONE-WAY PIG MEANS

BACKGROUND OF THE INVENTION

1. Field of the Invention

This invention relates to a novel one-way pig means which is adapted to travel in one direction through a pipeline and useful in such procedures as the recovery of marine pipelines from the sea floor and the detection of pipeline leaks. More specifically, the present invention is directed to a one-way pig means which operates, not by the action of hardened teeth engaging the pipeline, but by a wedging action of a disc-shaped plate against a pigging cup of resilient material which provides a tight, leakproof seal against the pipeline wall.

2. Description of the Prior Art

Pigging means have been proposed and utilized in connection with pipeline repair and leak-detecting methods with the more recent development of one-way pig means, i.e., pig means adapted to travel through a pipeline in one direction and to resist travel in the opposite direction.

For example, a typical pigging device that can be passed through pipelines and used in hydrostatic testing for pipeline leaks is shown in U.S. Pat. No. 3,693,408. The particular pigging device of this patent is adapted for movement in either direction in response to a differential pressure and requires the application of pressure to both ends of the pipeline to place the device in an anchored and sealing position. This device is, therefore, disadvantageous from the standpoint of raising marine pipelines or detecting leaks. In addition, operation of the anchoring mechanism does not appear to be dependable, especially if there is a substantial leak in the pipeline or if the space between the device's front and rear sealing elements fills with water through slight leaking of said sealing elements.

A further type of pig, shown in U.S. Pat. No. 3,690,348, is one that can be moved in either direction with an anchoring valve operable by radio control for anchoring the pig in the pipeline. Since this system requires electronic equipment the use of the pig is disadvantageous in that the complexity and the cost of the equipment preclude satisfactory and efficient employment.

An improved pig specifically adapted for the recovery of marine pipelines is disclosed in copending application Ser. No. 265,900, filed June 23, 1972, now U.S. Pat. No. 3,788,084. This pig is a one-way pigging device fitted with a piston, resilient diaphragm, or similar member which moves axially with reference to the outer framework of the pig so that the pig moves in one direction through the pipeline in response to a differential pressure and is anchored when a differential pressure is applied from the opposite direction. In accordance with such application, the piston, diaphragm, or the like is mounted on or connected to a central sleeve fitted with pivoted arms which are restrained near their outer ends by pins passing through slots in the frame of the apparatus. The outer ends of the arms are provided with hardened teeth, pads having a high friction coefficient, or similar means to engage the inner wall of the pipe in which the apparatus is utilized thereby providing the necessary tight, leakproof seal. Such copending application describes a novel technique utilizing this one-way pig for recovering marine pipelines which greatly improves previously developed recovery procedures.

The method described in such copending application involves the recovery of a submerged end of a liquid-filled pipeline from the sea floor by inserting into the submerged end of the pipeline a one-way pigging device, as described, adapted to move forward in the pipeline in response to fluid pressure from behind the device and to resist movement in response to fluid pressure from the opposite direction. A gas is introduced into the submerged end of the pipeline behind the pigging device with sufficient pressure to move the pigging device forward in the pipeline while preventing the entry of water into the submerged end until the pigging device has traversed a section of the pipeline sufficiently long to extend at least to the surface of the body of water. The introduction of gas is discontinued and the submerged end of the pipeline is lifted to the water's surface, the pigging device preventing the backflow of liquid in the pipeline in respsonse to pressure changes. The use of the one-way pig for recovering a submerged end of a liquid-filled pipeline from the sea floor eliminates the problems associated with the use of conventional pigging devices and similar processes since in this method there is no need to carry out the costly and time-consuming procedure of running the pipeline pig through the entire line from a shore station or platform to the point where the damage exists.

A further method improved by the use of a one-way pig means is described in copending application U.S. Ser. No. 413,008 filed concurrently herewith. This copending application describes a method of testing liquid-filled pipelines for leaks by introducing a one-way pigging device into one end of a pipeline and positioning the pigging device at successive locations along the length of the pipeline by hydraulic pressure applied at the same end of the pipeline. At each location a testing pressure is introduced at the opposite end of the pipeline thereby indicating leaks in the pipeline based upon the presence or absence of a pressure drop. The one-way pig moves in one direction in response to a pressure differential and becomes anchored at a location in response to a pressure differential in the opposite direction. Here again the application of a one-way pig eliminates the disadvantages associated with previously proposed techniques for leak detection utilizing conventional pig means.

SUMMARY OF THE INVENTION

The present invention provides a novel, improved, one-way pig specifically adapted for application in the procedures set forth above including recoverey of marine pipelines and detection of pipeline leaks wherein the one-way pig eliminates the pivoted arms with hardened teeth associated with previous one-way pig designs while providing the necessary tight, leakproof seal between the pig and the pipeline wall through a wedging action of a disc-shaped, rigid plate against a resilient pigging cup. The one-way pig of the present invention includes a set of cup-type sealing members supported on a body member which includes a set of cup-shaped wedging members movable relative to the cup members to lock the cup members against the wall surface of the pipeline upon the application of pressure opposite the direction of travel of the pig. Such one-way pig, in accordance with the present invention, will provide a tight, leakproof seal between the pig and the pipeline wall since as the application of pressure in the direction opposite the direction of pig travel becomes higher, the wedging action becomes greater. Again, the one-way pig of the prsent invention is adapted to provide improved procedures in those environments wherein one-way pigs have been previously utilized.

DESCRIPTION OF THE PREFERRED EMBODIMENTS

Figure 1:
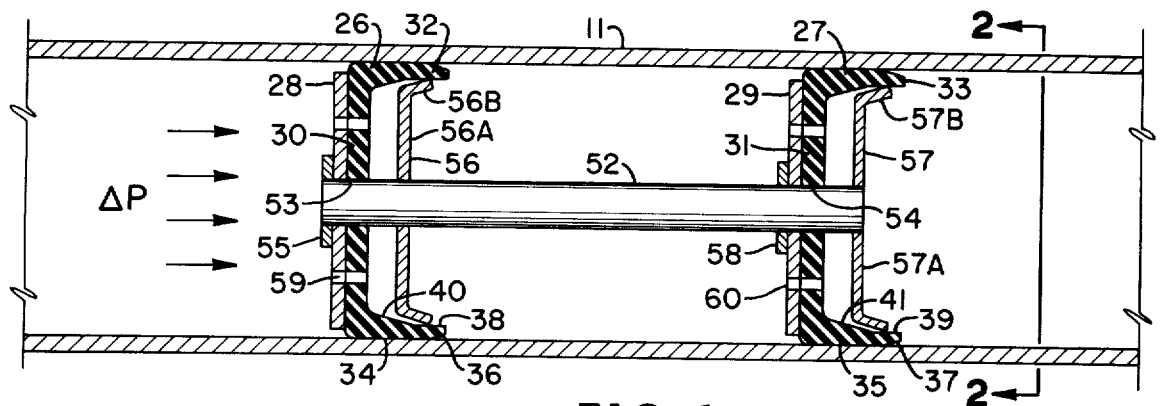
FIG. 1 is a longitudinal, cross sectional view of the pipeline pig of the present invention in one condition of operation for movement through a pipeline.
Figure 2:
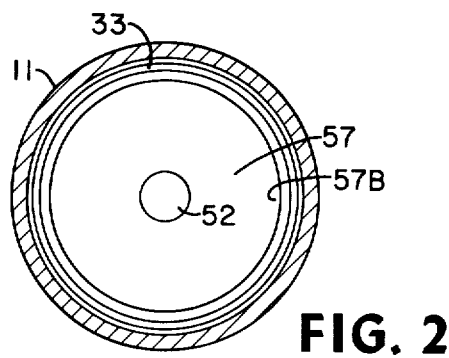
FIG. 2 is a cross sectional end view of the pipeline pig of FIG. 1, looking in the direction of movement of the pig through a pipeline.
Figure 3:
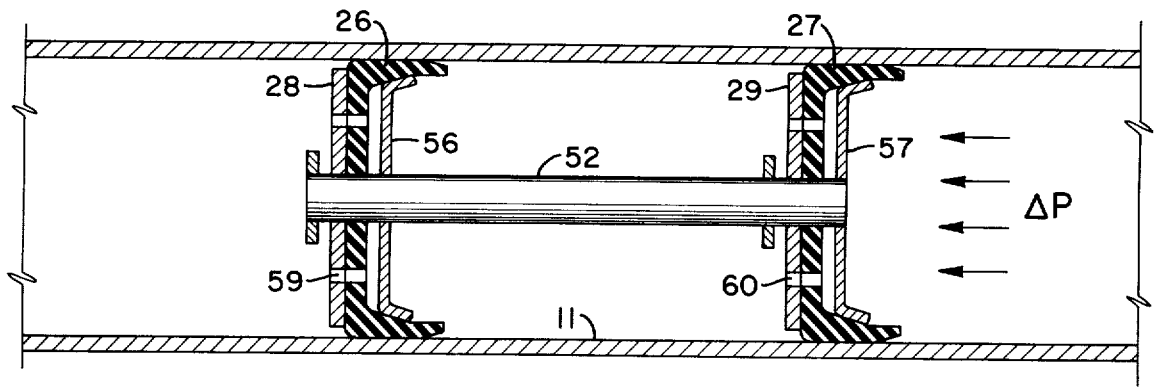
FIG. 3 is a further longitudinal, cross sectional view of the pipeline pig of the present invention in a condition where the pressure differential is in an opposite direction and the pipeline pig is in an anchored position.

In FIGS. 1 through 3, the pig of the present invention is illustrated within pipeline 11. The pipeline pig means as illustrated includes a pair of annular, disc-shaped or cup-type packing elements 26 and 27, spaced longitudinally from one another, attached to and supported by cylindrical disc members 28 and 29. The disc members 28 and 29 are composed of a rigid material and have a plate-like configuration with diameters slightly less than the diameter of the pipeline 11 so that disc members 28 and 29 provide a backup support for the resilient packing elements or cups 26 and 27. The packing elements or cups 26 and 27 are made of a resilient material such as natural or synthetic rubber, polyurethane, etc. In addition, while the embodiment shown in FIGS. 1 through 3 illustrates the employment of two such packing elements with associated means, the pipeline pig of the present invention can include only one such packing element or can, where desired, include more than two such packing elements. For purposes of the following explanation, however, the pipeline pig of the present invention will be described in connection with the illustration of two packing elements 26 and 27 in accordance with the preferred embodiment of the present invention.

The packing elements or cups 26 and 27 respectively have central portions 30 and 31 and outer lip-like portions 32 and 33 which taper from the central portion to a narrower lip portion at that end which is forward to the direction of pig travel through the pipeline. As illustrated, the outer surfaces 34 and 35 are cylindrically formed over the length of the lip-like portions 32 and 33 and have inwardly tapered wall sections 36 and 37. The inner walls of the lip portions 32 and 33 are generally cylindrically formed at the outer portions 38 and 39 and tapered at 40 and 41 to increase the wall thickness and provide a desired sealing surface.

The packing element assemblies described above have central bores 53 and 54 which are slidably mounted on a cylindrically shaped body member 52 made of steel or similar material. The body or support member 52 is arranged for support along the central axis of the pipeline 11 and at one end of the support member 52 are spaced apart members 55 and 56 including an end member 55 forming a flange and a first anchoring member 56. The first anchoring member 56 has a plate-like or disc-shaped configuration and is constructed of steel or similar material. A central plate-like portion 56A of the anchoring member is disposed normal to the axis of support member 52 and an outwardly tapering, flange-like portion 56B forms the periphery of the anchoring member. The flange-like portion 56B is arranged to have a complementary taper to the taper of wall portion 40 in the sealing element.

At the other end of support member 52 spaced apart members 57 and 58 are located and arranged in substantially the same manner as spaced apart member 55 and 56, such spaced apart members including a second anchoring member 57 at the end of support member 52 and a flange member 58 disposed along the length of support member 52. The second anchoring member 57 is formed and shaped similar to the first anchoring member 56 with the spacing between members 55 and 56 being similar to the spacing between members 57 and 58.

The packing element assemblies employed in the pipeline pig of the present invention each preferably have bypass openings 59 and 60 through the plate and sealing members to permit fluid to pass through disc members 28 and 29 and cups 26 and 27. As shown in FIG. 1, a differential pressure $\Delta P$ applied to the left side of the pig will cause the pig to travel in a direction towards the right and fluid under pressure applied to plate 28 can bypass the cups through openings 59 and 60. Accordingly, the pressure can be applied to the anchoring members 56 and 57. Although some fluid may bypass between the tapered flange portions 56B and 57B and the lips of the sealing elements, this amount will be negligible.

Whether the one-way pig of the present invention is employed to recover a marine pipeline or used to detect a pipeline leak, the operation including transporting the pig through the pipeline and anchoring the pig will be the same. In this regard, as noted from FIG. 1 and as indicated above, the application of a pressure differential from the left will move the pig through the pipeline and the pig will continue to move through the pipeline as long as the pressure differential is applied and as long as anchoring the pig by application of an opposite pressure differential has not taken place. To anchor the pig at a desired location, the pressure differential utilized to transport the pig is discontinued and a second pressure differential is applied to the pig as seen in FIG. 3 from the direction opposite the direction of pig travel. When this second pressure differential is applied, anchoring members 56 and 57 are launched against the cup-type packing elements 26 and 27 forcing the outer lip portions 32 and 33 against the inner wall of pipeline 11 thereby forming a tight, leakproof seal. This leakproof seal is extremely tight since the seal becomes tighter and more leakproof as the pressure differential becomes higher. Accordingly, the wedging action associated with the wedging of anchoring members 56 and 57 against cup-type packing elements 26 and 27, respectively, provides for anchoring the one-way pig in a manner not associated with previously developed elements. This, therefore, allows the one-way pig of the present invention to be suitably and effectively employed in the environments previously discussed.

When utilized for the recovery of an underwater pipeline, the oneway pig of the present invention will be inserted into the submerged end of a pipeline with a gas being introduced behind the pig under sufficient pressure to move the pig forward in the pipeline while preventing the entry of water into the submerged end until the pig has traversed a section of pipe sufficiently long to extend at least to the surface of the body of water in which the pipeline is submerged. The introduction of gas will then be discontinued and the submerged pipeline will be lifted to the water's surface. The one-way pig, due to its construction, will prevent the backflow of liquid in the pipeline in response to pressure changes.

When utilized to locate a pipeline leak, the one-way pig will be introduced into the end of a pipeline and transported in the pipeline by means of applied hydrostatic pressure to a first location. The volume of water introduced into the pipeline will be metered so that the location of the pig in the pipeline can be calculated and when the pig is approximately located, pressure will be applied to the opposite end of the pipeline, thereby anchoring the pig in position in the pipeline. The continued application of pressure from the opposite end of the pipeline will determine whether any pressure drops occur indicating a leak in the pipeline between the pig and the point of application of the opposite pressure. If a pressure drop is observed the pig will be transported to a second location and the procedure repeated until the location of the leak is found. The unique nature of the one-way pig in anchoring by application of an opposite pressure force allows the pig to be effectively utilized for pipeline leak detection.

While the present invention has been described primarily with regard to the foregoing exemplification, it should be understood that the present invention cannot under any circumstances be deemed as limited thereto but rather must be construed as broadly as any and all equivalents thereof.

I claim:

1. A pipeline pig for unidirectional travel within a pipeline comprising:
    a body member;
    at least one cup-type sealing element slidably supported on said body member and having a lip portion extending forwardly in the direction of travel of said pig; and
    anchor means positioned on the body member and responsive to a pressure differential across the pig opposite the direction of travel thereof to force the lip of the sealing element against the wall of the pipeline to form a seal therewith, said anchor means being responsive in the anchored mode to a pressure differential across the pig in the direction of travel thereof to release said sealing element to permit the pig to advance within the pipeline.

2. The apparatus of claim 1 wherein said sealing element is attached to a rigid cylindrical-shaped disc having a diameter slightly less than the inner diameter of said pipeline.

3. The apparatus of claim 2 wherein said sealing element and cylindrical disc each include a bypass opening extending therethrough.

4. The apparatus of claim 1 wherein said anchor means includes a rigid, disc-shaped plate affixed to the body member and movable therewith in response to a pressure differential in a direction opposite the direction of travel of the pig.

5. The apparatus of claim 4 wherein the rigid disc-shaped plate includes a tapered flange.

6. The apparatus of claim 1 wherein the inner surface of the lip portion of the cup-type sealing element is tapered.

* * * * *